United States Patent Office 3,538,065
Patented Nov. 3, 1970

3,538,065
POSTHALOGENATED NITRILE POLYMERS
Russell K. Griffith, Chagrin Falls, John F. Jones, Cuyahoga Falls, and Harry R. Musser, Bedford, Ohio, assignors to The Standard Oil Company, Cleveland, Ohio, a corporation of Ohio
No Drawing. Filed Mar. 6, 1967, Ser. No. 620,597
Int. Cl. C08f 3/78
U.S. Cl. 260—88.7          7 Claims

ABSTRACT OF THE DISCLOSURE

Posthalogenated nitrile polymers such as postchlorinated polymethacrylonitrile which are of improved flame resistance, solvent resistance and processibility are provided by a posthalogenation process which includes catalytic activation.

---

This invention relates to posthalogenated nitrile polymers and more particularly pertains to postchlorinated homopolymers and copolymers of certain olefinic nitriles and to the process for preparing same.

It is a primary object of this invention to provide a method for preparing novel halogenated nitrile polymer compositions having good heat stability and materially increased processibility. Another object is the provision of novel polymers having improved solvent and flame resistance.

Nitrile polymers are well known to those skilled in the art. Methacrylonitrile polymers such as polymethacrylonitrile and methacrylonitrile copolymers containing a predominant amount of polymerized methacrylonitrile, for instance, are well known and very useful materials. Such polymers suffer the disadvantages of being unusable at moderately elevated service temperatures; they will burn and they sag badly or sometimes decompose at the elevated processing or service tempratures rquired for fabrication.

Methacrylonitrile polymers such as polymethacrylonitrile and copolymers of methacrylonitrile and one or more vinyl monomers are useful components for films, pipe, tubing, bottles and other types of containers and packaging materials. Methacrylonitrile polymers and copolymers are thermoplastic and can be fabricated but they are attacked by some common solvents, do support combustion and are difficult to process. There is a need for a material having all of the aforementioned excellent properties and in addition having increased processibility, materially decreased softening temperatures, excellent resistance to common solvents and improved resistance to combustion.

The posthalogenation process of this invention is carried out on a preformed methacrylonitrile polymer or mixture of polymers. Preferably the posthalogenation is carried out on the methacrylonitrile polymer in the presence of an activator such as a free radical initiator, ultraviolet light, X-rays, ultrasonic waves or some form of nuclear radiation.

The starting polymers for the posthalogenation process of this invention are preferably resinous and include those having apparent molecular weights as indicated by their solution viscosity, melt viscosity, etc., of at least about 6,000 and more advantageously from about 20,000 to 5,000,000 and more, resulting from the polymerization of methacrylonitrile. It is also contemplated to replace up to about 30% and preferably up to about 15% by weight of the methacrylonitrile in the polymers embodied herein with one or more other polymerizable vinyl monomers including monoalkenyl or polyalkenyl monomers copolymerizable therewith.

Polymerizable monoalkenyl monomers useful in the methacrylonitrile polymers of the present invention include the acrylate esters such as methyl acrylate, ethyl acrylate, the propyl acrylates, the butyl acrylates, the amyl acrylates, the hexyl acrylates, cyclohexyl acrylate, phenyl acrylate, the octyl acrylates and the like; the methacrylate esters such as methyl methacrylate, ethyl methacrylate, the propyl methacrylates, the butyl methacrylates, the amyl methacrylates, the hexyl methacrylates, cyclohexyl methacrylate, phenyl methacrylate, the decyl methacrylates and the like; vinyl esters such as vinyl acetate, vinyl propionate, the vinyl butyrates, vinyl benzoate, isopropenyl acetate and the like; the vinyl aromatics such as styrene, alpha-methyl styrene, vinyl toluene, the vinyl xylenes, the vinyl naphthalenes, isopropenyl benzene and the like; vinyl amides such as acrylamide, methacrylamide, N-methyl acrylamide, vinyl benzamide, N-vinyl pyrrolidone and the like; the vinyl halides such as vinyl chloride, vinyl bromide, vinyl fluoride, vinylidene chloride, vinylidene fluoride, dichloro difluoro ethylene, tetrafluoroethylene and the like; olefins such as ethylene, propylene, isobutylene, butene-1 and the like.

The polyalkenyl monomers useful in the methacrylonitrile polymers of this invention must contain at least two polymerizable alkenyl groups and preferably at least two $CH_2=C<$ groups per molecule separated by at least one other group. Such materials include allyl acrylate, allyl methacrylate, diallyl maleate, diallyl fumarate, ethylene glycol dimaleate, diallyl itaconate, methallyl acrylate, divinyl ether, diallyl ether, dimethallyl ether, ethylene glycol dimethacrylate, glyceryl triacrylate, sucrose hexaacrylate, diallyl phthalate, triallyl cyanurate, 1,5-hexadiene, 1,6-heptadiene, 1,7-octadiene, 1,8-nondiene, divinyl biphenyl, divinyl naphthalene, divinyl benzene, trivinyl benzene, diallyl benzene, diisopropenyl benzene, allyl allyloxyacetate, ethylidene dimethacrylate, methylene dimethacrylate, diallyl melamine, diallyl isomelamine, triallyl melamine, triallyl aconitate, triallyl phosphate, tetraallyl silane, tetravinyl silane, diallyl vinyl silane, tetraallyl germane, tetravinyl tin, tetravinyl germane, triacryloyl perhydrotriazine, trimethacryloyl perhydrotriazine, methylene-bis-acrylamide, ethylene diacrylamide, N-allyl acrylamide, N,N-diallyl acrylamide, N,N-dimethallyl methacrylamide, polyallyl ethers of polyhydric alcohols such as tetraallyl pentaerythritol, hexaallyl sucrose, hexaallyl inositol, hexaallyl sorbitol, hexavinyl sucrose and the like.

Most preferred in this invention are methacrylonitrile homopolymers.

The methachylonitrile polymers useful herein may be prepared in any convenient manner such as by bulk, solution, emulsion or suspension polymerization techniques, all of which are well known in the art. It is preferred because of the convenience that the polymers be prepared in an aqueous medium in emulsion or suspension. Suitable emulsifiers, surface active agents or dispersing agents may be used in the aqueous polymerization procedure.

The polymerization reaction may be carried out by adding all of the monomer component to the polymerization reaction mixture at once or in increments or in a continuous manner during the course of the polymerization reaction.

At the conclusion of the polymerization, the polymers may be isolated by a variety of known methods. For example, the aqueous dispersion of polymers may be sprayed into a heated and/or evacuated chamber whereby the water is removed as vapor and the polymer falls to the bottom of the chamber. When the polymer is prepared in sufficiently high solids, it often can be isolated as a fine granular powder simply by filtration or centrifugation. A satisfactory procedure consists in adding an appropriate amount of electrolyte solution to the diluted aqueous dispersons with rapid agitation at a temperature just below the point at which the precipitated particles tend to adhere.

According to the process of this invention the methacrylonitrile polymer is halogenated in solution, in bulk or in suspension in a liquid or gaseous carrier by contacting it with liquid, gaseous or a solution of the halogen. Preferred halogens are chlorine and bromine and most preferred for the purpose of the invention is chlorine.

In a preferred process the methacrylonitrile polymer to be halogenated is suspended in an aqueous medium which also may contain from about 0.5 to 25% by volume based on the total liquid content of said medium of a swelling agent for the methacrylonitrile polymer. The slurry-like mixture should contain from about 5 to 60% by weight of the methacrylonitrile polymer. No real lower limit on slurry solids content exists, although practical economic considerations require a minimum of no less than about 1–5%, and upper limits are similarly limited by stirring power. Useful swelling agents are materials which are capable of swelling the methacrylonitrile polymer or the halogenated polymer or both. Swelling agents include, but are not limited to such materials as halogenated hydrocarbons. Particularly useful swelling agents includes chlorinated aliphatic hydrocarbons having from 1 to 20 carbon atoms such as chloroform, carbon tetrachloride, tetrachloroethylene, etc.

The halogenation can be carried out in the temperature range of about −100° C. to 100° C. or higher. Usually the reaction is carried out at temperatures in the range of from about 20° C. to 100° in order to insure stable products as well as a reasonable rate of halogenation. The halogenation can be carried out at atmospheric pressure or at pressures below or above atmospheric. For convenience it is usually carried out at about atmospheric pressure. Although it is not absolutely essential, it is preferred that oxygen be substantially excluded from the halogenation reaction.

Although the halogenation reaction will proceed particularly at higher pressures and temperatures in the absence of any added catalyst, it is usually preferred to use catalytic activation of the halogen. This catalytic activation can be accomplished by means of actinic radiation such as ultraviolet radiation, X-rays or the various types of nuclear radiation as well as ultrasonic waves.

Chemical activation of the halogen can also be accomplished by adding free radical initiators to the halogenation reaction mixture. Useful free radical initiators include, but are not limited to, peroxy compounds such as hydrogen peroxide, benzoyl peroxide, acetyl peroxide, acetyl benzoyl peroxide, peracetic acid, hydroxy heptyl peroxide, isopropenyl percarbonate, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, lauroyl peroxide, caprylyl peroxide, methyl cyclohexyl hydroperoxide, t-butyl permaleic acid, t-butyl perbenzoate, di-t-butyl diperphthalate; azo compounds such as azobisisobutyronitrile; sodium, potassium and ammonium persulfate and the water-soluble "redox" types of catalyst including the combination of one of the water-soluble peroxygen compounds such as potassium persulfate with a reducing substance such as a polyhydroxy phenol or an oxidizable sulfur compound such as sodium bisulfite, sodium sulfite and the like.

As the aqueous suspensions of methacrylonitrile polymers are practically opaque to light, it is important that light sources be supplied throughout the bulk of the reaction mixture in order to obtain maximum benefit.

The halogenation reaction can be carried out in a single stage or in multiple stages in which the conditions, solvents, activators, etc., may be the same or different. For instance, in the first stage the nitrile polymer can be chlorinated to a certain degree and then transferred to a solvent for the partially chlorinated product in which more complete chlorination is achieved quickly in a second stage.

Preferably when a free radical initiator is used it should be one which has an efficient rate of decomposition in the halogenation medium in the required temperature range. It may be advantageous to employ a mixture of free radical initiators, one of which has a temperature of efficient decomposition at or near the optimum initial chlorination temperature, and the other having an efficient decomposition at or near the optimum sequential chlorination temperature.

The entire chlorination procedure or any desired part of it may be carried out batch-wise or by continuous processing arrangements. For batch operations, it is ordinarily suitable to employ conventional autoclaves and kettles or the like for conducting the reaction. However, the chlorination may also be conveniently conducted in a continuous process by any one of several suitable techniques. For example, it may be conducted by counter-current movement of the reactants through either horizontally or vertically disposed reactors which may be in the form of tubes and towers, or by using a cascading principle with a series of interconnected reaction chambers.

Substantial yields, based on the weight of the polymer to be chlorinated, may be frequently obtained by the chlorination technique used in the present invention.

This invention also contemplates reacting in the presence of actinic radiation, water-laden chlorine gas with substantially dry methacrylonitrile polymer, preferably in a fluidized bed reactor.

We have discovered that methacrylonitrile polymers and copolymers can be chlorinated by treating them with liquid chlorine. In this instance liquid chlorine serves both as the swelling agent for the polymer and also as the chlorinating agent. In the practice of this feature of our invention, one of the normally solid polymers or copolymers is suspended in liquid chlorine, thereafter the temperature of said suspension is raised, whereupon the excess chlorine is removed therefrom, leaving a residue which is chlorinated polymer.

Following the completion of the halogenation reaction, the polymer slurry can be filtered or centrifuged to free it of the water phase and the solid polymer phase can be neutralized by the addition thereto of a water-soluble base such as sodium, potassium or ammonium hydroxides, carbonates, bicarbonates, urea, alkali phosphates, etc. The neutralized polymer can then be washed to remove residual electrolyte and the polymer can then be dried.

The stability of the chlorinated polymer is influenced to some degree by the thoroughness with which contaminating substances such as chlorine, metal salts, particularly iron salts, hydrochloric and hypochlorous acids, and the like, are removed and therefore adequate washing of the product is important in obtaining a product of highest quality. To the water used in washing there may be added various anti-acids and anti-chlors well known in the art. After the final wash the chlorinated polymer may be dried in an oven.

In general the chlorinated products of the present invention include those having specific gravities at 77° F. of above 1.1168 and containing from 0.1% to 50% by weight of chemically bound chlorine. Although the chlorinated polymers of this invention containing more than about 15% by weight of chlorine are of higher softening temperature, superior flame resistance and solvent resistance, they are more difficult to prepare and process. More preferred are the chlorinated methacrylonitrile polymers of this invention having specific gravities of from 1.1168 to 1.2145 and containing from 0.1% to about 15% by weight of chlorine.

The chlorinated products may be stabilized by incorporating therein from about 1 to 10% by weight of a stabilizer. Dibutyl tin laurate, barium, cadmium, calcium and lead laurates and stearates, tin maleate types, epoxy type esters and polymers and the like have a stabilizing action. Numerous other stabilizers such as those disclosed in British Plastics, vol. 27, pages 176–9 (1954), as well as in U.S. Pat. No. 2,075,543 are operative in the chlorinated products of this invention. The inclusion of well-known fillers, pigments, coloring agents and the like in the chlorinated products of this invention is contemplated to be within the scope of this invention.

It is also contemplated to carry the halogenation out in the presence of inert substances of inorganic or organic chemical nature which will remain in the final halogenated product. The presence of these materials also often prevent agglomeration of the starting polymer or product during the halogenation so that the final product can be obtained in a finely flocculent and pulverulent state suitable for easy workup.

As inert substances the following inorganic materials may be used: silicic acid, kieselguhr, barium sulfate, asbestos, titanium dioxide, graphite, silicon carbide, or glass such as powdered glass. As organic substances one may use plastics containing carbon and halogen and, if desired, hydrogen such as polyvinyl chloride, polyvinylidene chloride, polychloroprene, polytetrafluoroethylene, polytrifluorochloroethylene, or copolymers such as vinyl chloride, vinylidene chloride copolymers. There may also be used plastic materials which are further chlorinated under the reaction conditions.

The chlorinated products of the present invention have a wide variety of uses and applications. Optimum utility, of course, depends upon the nature of the polymer employed and the halogen content of the final product. For instance, they may be made into films, sheets, tubes and filaments and other extruded forms and shapes for employment in packaging and other protective and decorative applications such as luggage, raincoats, food coverings, etc. Advantage may be taken of their flame resisting or fire retarding characteristics and thus they can be used as impregnating and coatings for fabrics to protect them from fungi, fire and water. They may also be employed in castings or molded into a variety of useful shapes having desirable properties and characteristics. They may also be prepared into expanded foam structures by the incorporation and release of suitable blowing agents and propellants in a known manner. In addition, they may be blended with other types of polymeric materials to obtain improved and more desirable products for any of these uses. In addition, the non-halogenated nitrile polymers described herein may in some instances be advantageously blended with other types of materials, such as vinyl polymers and copolymers of many types, and subsequently halogenated by this process described in the present invention.

The following examples will further illustrate this invention.

EXAMPLE I (A) Polymethacrylonitrile was prepared from the following recipe:

| | Parts by weight |
|---|---|
| Water | 192 |
| Methacrylonitrile | 100 |
| Emulsifier (GAFAC RE-610 [1]) | 3.0 |
| t-Butyl peroxy pivalate | 0.3 |
| n-Dodecyl mercaptan | 0.8 |

[1] A mixture of R—O—($CH_2CH_2O$—)$_n PO_3M_2$ and
[R—O—($CH_2CH_2O$—)$_n$]$_2PO_2M$
wherein $n$ is a number of from 1 to 40, R is an alkyl or alkaryl group and preferably a nonyl phenyl group and M is hydrogen, ammonia or an alkali metal, which composition is sold by the General Aniline and Film Corp.

The polymerization was carried out under a nitrogen atmosphere at 60° C. for 18 hours. The polymer was coagulated from the resulting latex with methanol and saturated aqueous aluminum sulfate solution. The polymer was isolated by filtration and was washed with water and dried in a circulating air oven at 40° C. The polymer was found to have an intrinsic viscosity of 0.709 in dimethyl formamide, a weight average molecular weight of 198,190 and a number average molecular weight of 77,298. An eight gram sample of this polymer was molded in a bar mold by compression at a pressure of about 6 tons at a mold temperature of 174° C. for 40 minutes. The resulting molded bar was found to have a heat distortion temperature of 94° C., a flexural strength of $16.1 \times 10^3$ p.s.i., flexural modulus of $6.72 \times 10^5$ p.s.i., tensile strength of $5.83 \times 10^3$ p.s.i., and Rockwell M hardness of 95. The burning rate of this polymer (ASTM D635–63) was found to be 1.56 inches/min. This polymer was found to swell and get sticky in chloroform and trichloroethylene. The Brabender torque at 35 r.p.m. and 187° C. for the polymer was 3100 gram-meters.

(B) One hundred grams of polymer A above were placed in a glass reactor along with 800 g. of water and 40 ml. of chloroform. The mixture was stirred, irradiated with an ultraviolet light source located close to the glass reactor, and gaseous chlorine was added to the mixture over a period of five hours. The reaction temperature was maintained at 24° C. during the reaction period. At the end of this time the ultraviolet lights were extinguished, he flow of chlorine was stopped and the solid polymer was separated from the liquid phase. The polymer product was dried in an air oven. The chlorinated polymer was found to contain 12.78% by weight of chlorine. Eight grams of the polymer were compression molded to a bar as in A above at a temperature of 154° C. to form a bar which had a heat distortion temperature of 85° C., a flexural strength of $12.0 \times 10^3$ p.s.i., a flexural modulus of $5.8 \times 10^5$ p.s.i., a tensile strength of $2.17 \times 10^3$ p.s.i., and a Rockwell M hardness of 94. The burning rate of this polymer (ASTM D635–63) was found to be 0.80 inch/min. This polymer was found to be completely insoluble in chloroform and trichloroethylene.

EXAMPLE II

The procedure of Example I(B) was followed with the exception that a two hour reaction time was employed. The polymer product was found to contain 7.8% by weight of chlorine. Some of this polymer was compression molded to form a bar at 173° C., six tons pressure for 51 minutes; and the molded bar was found to have a heat distorting temperature of 74° C., a flexural strength of $16.7 \times 10^3$ p.s.i., a flexural modulus of $6.36 \times 10^5$ p.s.i., a tensile strength of $9.13 \times 10^3$ p.s.i., and a Rockwell M hardness of 88. This polymer was also found to have a Brabender torque at 35 r.p.m. and 187° C. of 2700 gram-meters.

EXAMPLE III

The procedure of Example I(B) was repeated using 200 grams of water, 5 ml. of chloroform, only an external source of ultraviolet light, a reaction time of two hours and a reaction temperature of 60° C. The polymer product was found to contain 0.94% by weight of chlorine. This polymer had a Brabender torque at 35 r.p.m. and 187° C. of 3050 gram-meters.

EXAMPLE IV

The procedure of Example I(B) was repeated except that 20 ml. of chloroform, a reaction time of two hours, 20 ml. of aqueous hydrogen peroxide (30%) solution, a reaction temperature of 60° C. and no ultraviolet light source were employed. The polymer product was found to contain 5.5% by weight of chlorine. A compression molded bar of this polymer was found to have a heat distortion temperature of 79° C., a flexural strength of $14.6 \times 10^3$ p.s.i., flexural modulus of $6.61 \times 10^5$ p.s.i., a tensile strength of $9.08 \times 10^3$ p.s.i., and a Rockwell hardness M of 92.

EXAMPLE V

The procedure of Example I(B) was repeated with the exception that a two hour chlorination period and a reaction temperature of 60° C. were employed. The chlorinated product was found to contain 8.6% by weight of chlorine. A compression molded bar of the chlorinated polymer was found to have a heat distortion temperature of 57° C., a flexural strength of $18.2 \times 10^3$ p.s.i., flexural modulus of $6.4 \times 10^5$ p.s.i., a tensile strength of $7.62 \times 10^3$ p.s.i., and a Rockwell M hardness of 72.

EXAMPLE VI

The procedure of Example I(B) was repeated using 400 mls. of the polymer latex as prepared in Example I, 20 ml. of chloroform, a reaction time of 10 minutes and a reaction temperature of 60° C. The chlorinated product was found to contain 3.6% by weight of chlorine. A compression molded bar of the chlorinated polymer was found to have a heat distortion temperature of 82° C., a flexural strength of $15.2 \times 10^3$ p.s.i., a flexural modulus of $6.2 \times 10^5$ p.s.i., a tensile strength of $8.27 \times 10^3$ p.s.i., and a Rockwell M hardness of 86.

EXAMPLE VII

The procedure of Example I(B) was repeated with the exception that 1000 grams of acetonitrile were used in place of the water and chloroform. A reaction time of two hours and a reaction temperature of 40° C. were employed. The polymer product was found to contain 2.6% chlorine. A compression molded bar of the chlorinated polymer was found to have a heat distortion temperature of 84° C., a flexural strength of $13.9 \times 10^3$ p.s.i., a flexural modulus of $6.01 \times 10^5$ p.s.i., a tensile strength of $8.10 \times 10^3$ p.s.i., and a Rockwell M hardness of 97.

We claim:
1. A post-chlorinated methacrylonitrile homopolymer composition having a specific gravity at 77° F. of above 1.1168 and containing from 0.1 to 50% by weight of chlorine which results from the treatment of a methacrylonitrile homopolymer with chlorine in the presence of a swelling agent for the homopolymer at a temperature of from −100 to 100° C. in the presence of catalytic activation selected from the group consisting of hydrogen peroxide and ultraviolet light.

2. The composition of claim 1 having a specific gravity of from 1.1168 to 1.2145 and containing from 0.1 to about 15% by weight of chlorine.

3. The process for preparing a post-chlorinated methacrylonitrile homopolymer having a specific gravity at 77° F. of above 1.1168 and containing from 0.1 to 50% by weight of chlorine comprising treating a methacrylonitrile homopolymer with chlorine in the presence of a swelling agent for the homopolymer at a temperature of from about −100 to 100° C. in the presence of catalytic activation selected from the group consisting of hydrogen peroxide and ultraviolet light and recovering the post-chlorinated methacrylonitrile homopolymer product.

4. The process of claim 3 wherein the temperature is from 20 to 100° C.

5. The process of claim 4 wherein the swelling agent is chloroform.

6. The process of claim 5 wherein the catalytic activation is ultraviolet light.

7. The process of claim 5 wherein the catalytic activation is hydrogen peroxide.

References Cited
UNITED STATES PATENTS

| | | | |
|---|---|---|---|
| 2,326,095 | 8/1943 | D'Ianni | 260—88.7 |
| 2,379,409 | 7/1945 | Bacon et al. | 204—159.18 |
| 2,437,998 | 3/1948 | Clifford et al. | 260—88.7 |
| 2,537,627 | 1/1951 | Weissert et al. | 204—159.18 |

HARRY WONG, Jr., Primary Examiner

U.S. Cl. X.R.

117—140; 167—22; 204—159.18; 260—2.5, 29.6, 32.6, 33.8, 41, 45.75, 45.8, 45.85, 73, 78.5, 85.5, 891, 898